E. PARKER.
Seed Planter.
No. 20,440.
Patented June 1, 1858.
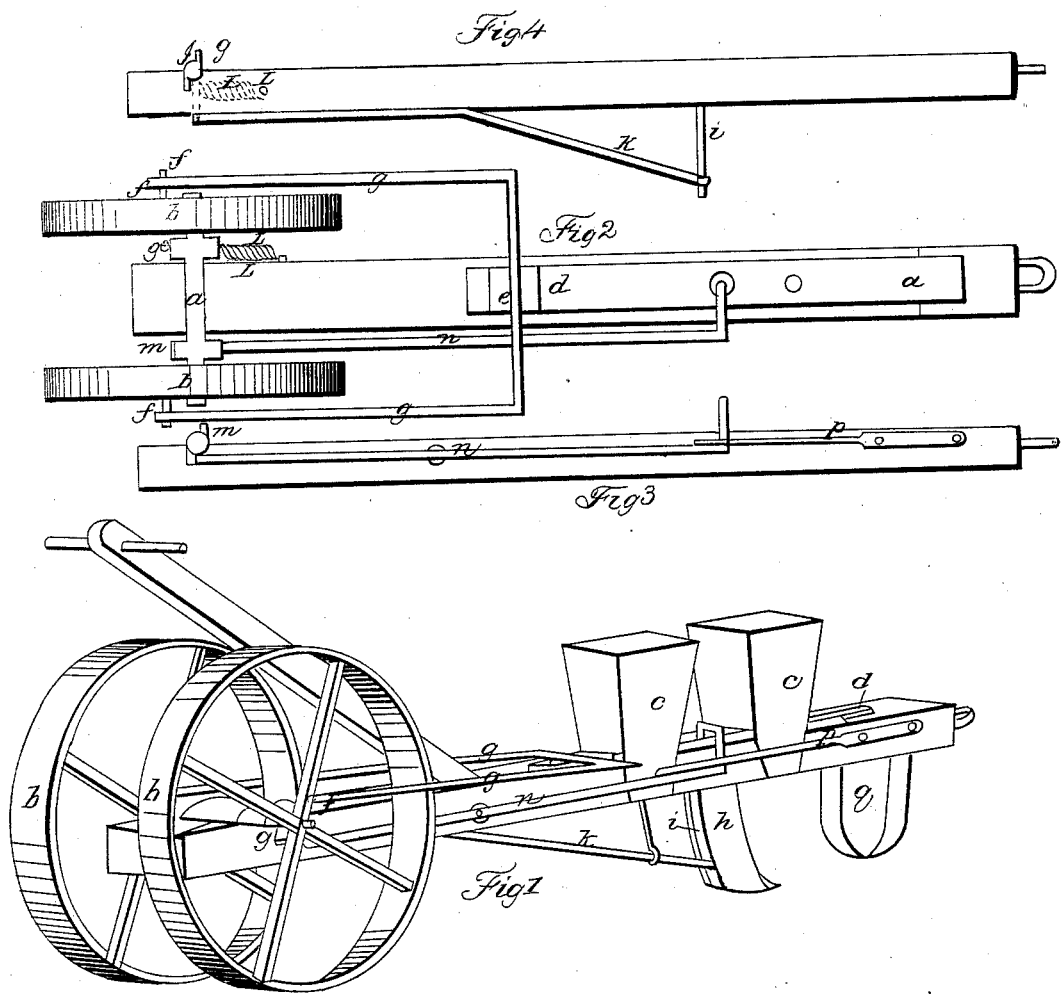

UNITED STATES PATENT OFFICE.

E. PARKER, OF BALTIMORE, MARYLAND.

IMPROVEMENT IN SEED-PLANTERS.

Specification forming part of Letters Patent No. 20,440, dated June 1, 1858.

*To all whom it may concern:*

Be it known that I, ELMORE PARKER, of Baltimore, in the county of Baltimore and State of Maryland, have invented a new and useful Improvement on a Corn and Cotton-Seed Planter; and I do hereby declare that the following is a full, clear, and exact description of the construction and operation of the same, reference being had to the annexed drawings, making a part of this specification, in which—

Figure 1 is a perspective view; Fig. 2, a top view; Fig. 3, a view of the rod, cam, and spring to press down the seed through the dropping-hole; and Fig. 4, a view of the rod, cam, and spring to shake the dropping-tube.

To enable others to make and use my improvement, I will proceed to describe its construction and operation.

I construct my planter by taking a piece of three-by-four scantling about six feet long, and near one end I hang a shaft, $a$, Fig. 2, across it. On each end of the shaft I secure firmly a wheel, $b\ b$, sufficiently large, so that the wheel turning round once will drop twice the right distance apart. Near the other end, which I will call the "forward" end, I place two seed-boxes, $c\ c$, on the top of the scantling, a little distance apart. I put my tube $i$, which carries the seed down to the ground, through the beam between the boxes. I make a slider, $d$, which has two holes in it, one for each box. This slider works in a groove upon the top of the beam and under the boxes. The holes are so made that when one hole is out over the tube the other is in one of the boxes. To give motion to the slider, I put a pin, $f f$, into each wheel, so as to give a crank motion to a rod or sweep that extends from the two pins forward and falls into a slot, $e$, in the slider. The rod I bend as seen in Fig. 2, $g\ g$. On the under side of the beam, just forward of the tube, I fasten a tooth, $h$, shaped like a cultivator-tooth, to open the ground for the seed to drop in. To prevent the tooth and earth from dragging along the seed out of its proper place, I put a cam, $j$, Fig. 4, on the shaft, inside of the wheel on one side, and run a rod, $k$, on the under side of the beam, bent down and fastened to the tube at its lower end. The cams are so arranged that when the wheel turns, and as quick as the seed drops, the cam will let the rod go, and by the spring $l$, Fig. 4, the tube and rod will spring forward off of the seed and let the seed lie where it is dropped, or nearly so. Inside of the other wheel, on the shaft, I put cams $m$, Fig. 3, and from them I run another rod, $n$, Fig. 3, as far forward as the dropping-tube, turned up over the beam, and the end turned down, so that it will go through the dropping-hole of the slider when the hole is out over the dropping-tube. When the cam lets the rod go (being hung on a pin near the middle, the forward end will spring down by means of the spring $p$ and knock out any seed that may be in the hole. I put a bow of strap-iron forward of the tooth to prevent it running too deep in the ground.

What I claim as my invention, and desire to secure by Letters Patent, is—

The arrangement of rods $n\ k$ and their springs $p\ l$ with the cams $j\ m$, the whole being constructed substantially as and for the purpose herein set forth.

ELMORE PARKER.

Witnesses:
DAVID ZIEGLER,
JNO. MCELROY.